(12) United States Patent
Waddell et al.

(10) Patent No.: US 7,696,266 B2
(45) Date of Patent: Apr. 13, 2010

(54) SELECT ELASTOMERIC BLENDS AND THEIR USE IN ARTICLES

(75) Inventors: Walter H. Waddell, Pasadena, TX (US); Donald S. Tracey, Kingwood, TX (US); Stuart W. Botfeld, Tampa, FL (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 303 days.

(21) Appl. No.: 11/791,885

(22) PCT Filed: Sep. 30, 2005

(86) PCT No.: PCT/US2005/035052

§ 371 (c)(1), (2), (4) Date: May 29, 2007

(87) PCT Pub. No.: WO2006/071312

PCT Pub. Date: Jul. 6, 2006

(65) Prior Publication Data

US 2008/0125521 A1 May 29, 2008

Related U.S. Application Data

(60) Provisional application No. 60/639,939, filed on Dec. 29, 2004.

(51) Int. Cl.
*B29C 47/00* (2006.01)
*C08F 255/08* (2006.01)

(52) U.S. Cl. ................................. 524/13; 525/320

(58) Field of Classification Search ........... 524/13
See application file for complete search history.

(56) References Cited

U.S. PATENT DOCUMENTS

| | | | |
|---|---|---|---|
| 5,063,268 A | 11/1991 | Young | |
| 5,333,662 A | 8/1994 | Costemalle et al. | |
| 5,386,864 A | 2/1995 | Costemalle et al. | |
| 5,391,625 A | 2/1995 | Arjunan | |
| 6,051,653 A | 4/2000 | McElrath et al. | |
| 6,293,327 B1 | 9/2001 | Minagawa et al. | |
| 6,624,220 B1 | 9/2003 | Waddell et al. | |
| 6,939,921 B2 | 9/2005 | Waddell et al. | |
| 7,329,697 B2 * | 2/2008 | Waddell et al. | ............ 524/47 |
| 2002/0100530 A1 | 8/2002 | McElrath et al. | |
| 2002/0151636 A1 | 10/2002 | Wada et al. | |
| 2004/0044118 A1 * | 3/2004 | Waddell et al. | ............ 524/525 |
| 2004/0242795 A1 | 12/2004 | Waddell et al. | |

FOREIGN PATENT DOCUMENTS

| | | |
|---|---|---|
| EP | 0 922 732 | 6/1999 |
| EP | 1 331 107 | 7/2003 |
| JP | 2003170438 | 6/2003 |
| JP | 2003192854 | 7/2003 |
| WO | WO 92/02582 | 2/1992 |
| WO | WO 92/03302 | 3/1992 |
| WO | WO 02/32994 A2 | 4/2002 |
| WO | WO 02/48257 A2 | 6/2002 |
| WO | WO 02/100936 A1 | 12/2002 |
| WO | WO 2004/058825 | 7/2004 |

* cited by examiner

*Primary Examiner*—Ling-Siu Choi
*Assistant Examiner*—Hui Chin
(74) *Attorney, Agent, or Firm*—Nancy T. Krawczyk; Leandro Arechederra (57) ABSTRACT

The present invention relates to select elastomeric blends including at least one halogenated random copolymer. In particular, the present invention relates to compositions including at least one halogenated random copolymer of isobutylene and methylstyrene, preferably para-methylstyrene; wherein the at least one halogenated random copolymer includes at least 9.0 wt % methylstyrene, preferably para-methylstyrene, based upon the weight of the at least one halogenated random copolymer; and at least one general purpose rubber. The invention also relates to articles made from these compositions and processes for making the same.

30 Claims, 1 Drawing Sheet

SELECT ELASTOMERIC BLENDS AND THEIR USE IN ARTICLES

CROSS REFERENCE TO RELATED APPLICATIONS

This application is a 371 National Stage Application of International Application No. PCT/US2005/035052, filed Sep. 30, 2005, which claims benefit of U.S. Provisional Application Ser. No. 60/639,939, filed Dec. 29, 2004, the disclosures of which are herein incorporated by reference in their entireties.

FIELD OF THE INVENTION

The present invention relates to select elastomeric blends including at least one halogenated random copolymer. In particular, the present invention relates to compositions including at least one halogenated random copolymer of isobutylene and methylstyrene, preferably para-methylstyrene; wherein the at least one halogenated random copolymer includes at least 9.0 wt % methylstyrene, preferably para-methylstyrene, based upon the weight of the at least one halogenated random copolymer; and at least one general purpose rubber. The invention also relates to articles made from these compositions and processes for making the same.

BACKGROUND

In the tire industry, manufacturers of tires and tire components have endless choices when fabricating such items. For example, the selection of ingredients for the commercial formulations of tires and tire components depends upon the balance of properties desired and the end use. In particular, when fabricating that portion of the tire relied upon for air impermeability such as the tire innerliner, manufacturers have applied a myriad approaches including the widespread use of "butyl" rubbers or elastomers in various embodiments. Butyl rubbers, generally, copolymers of isobutylene and isoprene, optionally halogenated, have widespread application due to their ability to impart desirable air impermeability properties for the tire. For example, due to economic advantages and processing benefits, blends of butyl rubbers with other rubbers such as natural rubbers have been useful.

However, such blends have their limitations. Thus, the tire industry continually seeks improvements to past applications. For example, Exxpro™ elastomers (ExxonMobil Chemical Company, Houston, Tex.), generally, halogenated random copolymers of isobutylene and para-methylstyrene, have been of particular interest due to their improvements over butyl rubbers. Similarly, as with butyl rubbers, due to economics and processing goals, producing a tire or tire components from 100% Exxpro™ elastomers is not the tire industry's ideal application. Therefore, in many cases, a blend of Exxpro™ elastomers with secondary elastomers or other polymers affords a compound having a desirable balance of properties achieved through suitable processing windows. See, e.g., U.S. Pat. Nos. 6,293,327, and 5,386,864, U.S. Patent Application Publication No. 2002/151636, JP 2003170438, and JP 2003192854 (applying various approaches of blends of commercial EXXPRO™ elastomers with other polymers).

Other background references include U.S. Pat. Nos. 5,063, 268, 5,391,625, 6,051,653, and 6,624,220, WO 1992/02582, WO 1992/03302, WO 2004/058825, EP 1 331 107 A, and EP 0 922 732 A.

However, due to the rigorous demands of tires and the tire industry's relentless pursuit of a better tire and/or a better process to produce the tire or its respective components, improvements to these blends are also desired. For example, commercial Exxpro™ elastomers, generally having about 5 wt % or about 7 wt % para-methylstyrene based upon the weight of the random copolymer, used alone or in combination with other polymers in blends, still necessitate improvements to the balances of properties for the tire or tire component and/or the process to produce the tire or tire components. Thus, the problem of improving processability of elastomeric compositions useful for tire articles while maintaining or improving the air impermeability and/or other properties of those compositions still remains.

SUMMARY OF THE INVENTION

In an embodiment, the invention provides for a composition comprising: at least one halogenated random copolymer of isobutylene and methylstyrene; wherein the at least one halogenated random copolymer comprises at least 9.0 wt % methylstyrene, preferably para-methylstyrene, based upon the weight of the at least one halogenated random copolymer; and at least one general purpose rubber.

In an embodiment, the at least one halogenated random copolymer may comprise at least 9.5 wt % methylstyrene, preferably para-methylstyrene, based upon the weight of the at least one halogenated random copolymer.

In an embodiment, the at least one halogenated random copolymer may comprise at least 10.0 wt % methylstyrene, preferably para-methylstyrene, based upon the weight of the at least one halogenated random copolymer.

In an embodiment, the at least one halogenated random copolymer may comprise at least 11.0 wt % methylstyrene, preferably para-methylstyrene, based upon the weight of the at least one halogenated random copolymer.

In an embodiment, the at least one halogenated random copolymer may comprise at least 12.0 wt % methylstyrene, preferably para-methylstyrene, based upon the weight of the at least one halogenated random copolymer.

In an embodiment, the at least one halogenated random copolymer may comprise at least 13.0 wt % methylstyrene, preferably para-methylstyrene, based upon the weight of the at least one halogenated random copolymer.

In any of the previous embodiments, the composition may comprise from 70 phr to 97 phr of the at least halogenated one random copolymer and from 30 phr to 3 phr of the at least one general purpose rubber.

In any of the previous embodiments, the composition may comprise from 75 phr to 97 phr of the at least halogenated one random copolymer and from 25 phr to 3 phr of the at least one general purpose rubber.

In any of the previous embodiments, the composition may comprise from 80 phr to 97 phr of the at least halogenated one random copolymer and from 20 phr to 3 phr of the at least one general purpose rubber.

In any of the previous embodiments, the composition may comprise from 85 phr to 97 phr of the at least halogenated one random copolymer and from 15 phr to 3 phr of the at least one general purpose rubber.

In any of the previous embodiments, the composition may comprise from 90 phr to 97 phr of the at least halogenated one random copolymer and from 10 phr to 3 phr of the at least one general purpose rubber.

In any of the previous embodiments, the at least one general purpose rubber may comprise natural rubbers (NR), polyisoprene rubber (IR), poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), or mixtures thereof.

DETAILED DESCRIPTION OF THE INVENTION

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

As used herein, the new numbering scheme for the Periodic Table Groups is used as set forth in CHEMICAL AND ENGINEERING NEWS, 63(5), p 27 (1985).

As used herein, a polymer may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, elastomer or elastomeric composition refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

As used herein, phr is parts per hundred rubber, and is a measure common in the art wherein components of a composition are measured relative to a major elastomer component, based upon 100 parts by weight of the elastomer(s) or rubber(s).

As used herein, isobutylene based elastomer or polymer refers to elastomers or polymers comprising at least 70 mol % repeat units from isobutylene.

As used herein, isoolefin refers to any olefin monomer having at least one carbon having two substitutions on that carbon.

As used herein, multiolefin refers to any monomer having two or more double bonds, for example, a multiolefin may be any monomer comprising two conjugated double bonds such as a conjugated diene such as isoprene.

As used herein, hydrocarbon refers to molecules or segments of molecules containing primarily hydrogen and carbon atoms. In some embodiments, hydrocarbon also includes halogenated versions of hydrocarbons and versions containing heteroatoms as discussed in more detail below.

Embodiments of the present invention include an elastomeric composition comprising at least one random copolymer comprising a $C_4$ to $C_7$ isomonoolefin. The at least one random copolymer may be halogenated with, for example, bromine or chlorine. In an embodiment, the at least one random copolymer is poly(isobutylene-co-p-alkylstyrene) comprising at least 10 wt % p-alkylstyrene, such as p-methylstyrene, based upon the total weight of the at least one random copolymer.

The elastomeric composition may also include a secondary elastomer. The secondary elastomer may be selected from "a general purpose rubber" such as natural rubber, butadiene rubber, and styrene-butadiene rubber, and mixtures thereof. The composition may also include at least one thermoplastic resin, at least one filler, and/or modified layered filler such as an organically modified exfoliated clay.

Elastomers

Elastomeric compositions of the present invention include at least one random copolymer comprising a $C_4$ to $C_7$ isomonoolefins, such as isobutylene and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of ethylene or a $C_3$ to $C_6$ α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in one embodiment, and in another embodiment from 0.1 to 5 mol %. In yet another embodiment, the amount of functionalized structure (2) is from 0.2 to 3 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

In an embodiment, the elastomer comprises random polymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography.

The elastomer such as the random copolymer discussed above may be prepared by a slurry polymerization, typically in a diluent comprising a halogenated hydrocarbon(s) such as a chlorinated hydrocarbon and/or a fluorinated hydrocarbon including mixtures thereof, (see e.g., WO 2004/058828, WO 2004/058827, WO 2004/058835, WO 2004/058836, WO 2004/058825, WO 2004/067577, and WO 2004/058829), of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

In an embodiment, brominated poly(isobutylene-co-p-methylstyrene) "BIMSM" polymers generally contain from 0.1 to 5% mole of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

In embodiments directed to blends, the at least one random copolymer as described above may be combined with a "general purpose rubber."

A general purpose rubber, often referred to as a commodity rubber, may be any rubber that usually provides high strength and good abrasion along with low hysteresis and high resilience. These elastomers require antidegradants in the mixed compound because they generally have poor resistance to both heat and ozone. They are often easily recognized in the market because of their low selling prices relative to specialty elastomers and their big volumes of usage as described by School in RUBBER TECHNOLOGY COMPOUNDING AND TESTING FOR PERFORMANCE, p 125 (Dick, ed., Hanser, 2001).

Examples of general purpose rubbers include natural rubbers (NR), polyisoprene rubber (IR), poly(styrene-co-butadiene) rubber (SBR), polybutadiene rubber (BR), poly(isoprene-co-butadiene) rubber (IBR), and styrene-isoprene-butadiene rubber (SIBR), and mixtures thereof. Ethylene-propylene rubber (EPM) and ethylene-propylene-diene rubber (EPDM), and their mixtures, often are also referred to as general purpose elastomers.

In another embodiment, the composition may also comprise a natural rubber. Natural rubbers are described in detail by Subramaniam in RUBBER TECHNOLOGY, p 179-208 (Morton, ed., Chapman & Hall, 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

In another embodiment, the composition may also comprise a polybutadiene (BR) rubber. The Mooney viscosity of the polybutadiene rubber as measured at 100° C. (ML 1+4) may range from 35 to 70, from 40 to about 65 in another embodiment, and from 45 to 60 in yet another embodiment. A commercial example of these synthetic rubbers useful in the present invention are BUDENE™ 1207 or BR 1207 (Goodyear Chemical Company, Akron, Ohio). An example is high cis-polybutadiene (cis-BR). By "cis-polybutadiene" or "high cis-polybutadiene", it is meant that 1,4-cis polybutadiene is used, wherein the amount of cis component is at least 95%. A particular example of high cis-polybutadiene commercial products used in the composition BUDENE™ 1207.

In another embodiment, the composition may also comprise a polyisoprene (IR) rubber. The Mooney viscosity of the polyisoprene rubber as measured at 100° C. (ML 1+4) may range from 35 to 70, from 40 to about 65 in another embodiment, and from 45 to 60 in yet another embodiment. A commercial example of these synthetic rubbers useful in the present invention is NATSYN™ 2200 (Goodyear Chemical Company, Akron, Ohio).

In another embodiment, the composition may also comprise rubbers of ethylene and propylene derived units such as EPM and EPDM as suitable additional rubbers. Examples of suitable comonomers in making EPDM are ethylidene norbornene, 1,4-hexadiene, dicyclopentadiene, as well as others. These rubbers are described in RUBBER TECHNOLOGY, p 260-283 (1995). A suitable ethylene-propylene rubber is commercially available as VISTALON™ (ExxonMobil Chemical Company, Houston, Tex.).

In another embodiment, the composition may comprise a so called semi-crystalline copolymer ("SCC"). Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The elastomer may be present in the composition in a range from up to 90 phr in one embodiment, from up to 50 phr in another embodiment, from up to 40 phr in another embodiment, and from up to 30 phr in yet another embodiment. In yet another embodiment, the elastomer may be present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit.

For example, the elastomer, either individually or as a blend of rubbers may be present in the composition from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Thermoplastic Resin

The compositions of the invention may optionally include a thermoplastic resin. Thermoplastic resins suitable for practice of the present invention may be used singly or in combination and are resins containing nitrogen, oxygen, halogen, sulfur or other groups capable of interacting with aromatic functional groups such as halogen or acidic groups. The resins are present from 30 to 90 wt % in one embodiment, and from 40 to 80 wt % in another embodiment, and from 50 to 70 wt % in yet another embodiment. In yet another embodiment, the resin is present at a level of greater than 40 wt %, and greater than 60 wt % in another embodiment.

Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 ENCYCLOPEDIA OF CHEMICAL TECHNOLOGY, P 1-105 (John Wiley & Sons 1968), CONCISE ENCYCLOPEDIA OF POLYMER SCIENCE AND TECHNOLOGY, P 748-761 (John Wiley & Sons, 1990), and 10 ENCYCLOPEDIA OF POLYMER SCIENCE AND TECHNOLOGY, P 392-414 (John Wiley & Sons 1969). Commercially available thermoplastic polyamides may be advantageously used in the practice of this invention, with linear crystalline polyamides having a softening point or melting point between 160 and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly($C_{2-4}$ alkylene terephthalates) such as polyethyleneterephthalate and polytetramethylene-terephthalate, poly($C_{2-4}$ alkylene isophthalates) such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

Other thermoplastic resins which may be used include the polycarbonate analogs of the polyesters described above such as segmented poly (ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one embodiment a homopolymer of propylene derived units, and in another embodiment a random copolymer or block copolymer of ethylene derived units and propylene derived units, and like thermoplastic resins as are known in the art.

Fillers

The elastomeric composition may have one or more filler components. For ease of reference, materials described herein and their equivalents will be referred to as filler(s).

Examples include but are not limited to calcium carbonate, clay, mica, silica and silicates, talc, titanium dioxide, starch and other organic fillers such as wood flower, and carbon black. In one embodiment, the filler is carbon black or modified carbon black.

A specific example includes a semi-reinforcing grade carbon black present at a level of from 10 to 150 phr of the composition, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners or innertubes are N550, N650, N660, N762, N990, and Regal 85 (Cabot Corporation, Alpharetta, Ga.) and the like.

The filler may also be a modified clay or be combined with a modified clay, such as an exfoliated clay. The layered filler may comprise a layered clay pre-treated with organic molecules.

Layered clays include at least one silicate.

In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. Nos. 3,252,757, 3,586,468, 3,666,407, 3,671,190, 3,844,978, 3,844,979, 3,852,405, and 3,855,147.

In yet other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered clay may be intercalated and exfoliated by treatment with organic molecules such as swelling or exfoliating agents or additives capable of undergoing ion exchange reactions with the cations present at the interlayer surfaces of the layered silicate. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives include those which can be covalently bonded to the interlayer surfaces. These include polysilanes of the structure —Si$(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, and 4,889,885 and WO92/02582.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 40 phr in one embodiment, and from 0.2 to 20 phr in yet another embodiment, and from 0.3 to 10 phr in yet another embodiment.

The exfoliating additive may be added to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In certain embodiments, treatment with the swelling agents described above results in intercalation or exfoliation of the layered platelets as a consequence of a reduction of the ionic forces holding the layers together and introduction of molecules between layers which serve to space the layers at distances of greater than 4 Å, alternatively greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

In certain embodiments, the layered filler comprises alkyl ammonium salts-intercalated clay. Commercial products are available as Cloisites produced by Southern Clay Products, Inc. (Gunsalas, Tex.). For example, Cloisite Na$^+$, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD. (Tokyo, Japan). For example, SOMASIF™ MAE, SOMASIF™ MEE, SOMASIF™ MPE, SOMASIF™ MTE, SOMASIF™ ME-100, LUCENTITE™ SPN, and LUCENTITE (SWN).

In certain embodiments, the layered filler generally comprise particles containing a plurality of silicate platelets having a thickness of 8-12 Å tightly bound together at interlayer spacings of 4 Å or less, and contain exchangeable cations such as Na$^+$, Ca$^{+2}$, K$^+$ or Mg$^{+2}$ present at the interlayer surfaces.

More recently, modifying agents also include polymer chains with functionalized units. For example, suitable modifying agents may comprise at least one polymer chain E comprising a carbon chain length of from $C_{25}$ to $C_{500}$, wherein the polymer chain also comprises an ammonium-functionalized group described by the following group pendant to the polymer chain E:

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

The modifying agent may also comprise at least one additional agent capable of undergoing ion exchange reactions with the cations present at the interlayer surfaces of the layered filler.

In other embodiments, the polymer chain may comprise a carbon chain length of from $C_{30}$ to $C_{400}$, preferably $C_{30}$ to $C_{300}$, and even more preferably $C_{30}$ to $C_{200}$.

In an embodiment, the polymer chain comprises isobutylene derived units with the ammonium-functionalized group as described above. In another embodiment, the polymer chain may consist essentially of poly(isobutylene) with the ammonium-functionalized group as described above. In yet another embodiment, the modifying agent may comprise at least one end-functionalized polyisobutylene amine.

Processing Aids

A processing oil may be present in blends or compositions of the invention. The processing oil may be selected from paraffinic oil, aromatic oils, naphthenic oils, and polybutene oils.

Distinctly, the polybutene processing oil is a low molecular weight (less than 15,000 Mn) homopolymer or copolymer of olefin derived units having from 3 to 8 carbon atoms, more preferably 4 to 6 carbon atoms. In yet another embodiment, the polybutene is a homopolymer or copolymer of a $C_4$ raffinate. Such low molecular weight polymers termed "polybutene" polymers is described in, for example, SYNTHETIC LUBRICANTS AND HIGH-PERFORMANCE FUNCTIONAL FLUIDS, P 357-392 (Rudnick & Shubkin, eds., Marcel Dekker, 1999) (hereinafter "polybutene processing oil" or "polybutene"). Examples of such a processing oil are the PARAPOL™ series of processing oils (ExxonMobil Chemical Company, Houston, Tex.), such as PARAPOL™ 450, 700, 950, 1300, 2400, and 2500. The PARAPOL™ series of polybutene processing oils are typically synthetic liquid polybutenes, each individual formulation having a certain molecular weight, all formulations of which can be used in the composition. The molecular weights of the PARAPOL™ oils are from 420 Mn (PARAPOL™ 450) to 2700 Mn (PARAPOL™ 2500). The MWD of the PARAPOL™ oils range from 1.8 to 3, preferably 2 to 2.8. The density (g/ml) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

In another embodiment, the processing aid may comprise polyalphaolefins (PAOs), high purity hydrocarbon fluid compositions (HPFCs) and/or Group III basestocks such as those described in WO 2004/014998 at page 16, line 14 to page 24, line 1. Examples of PAOs include oligomers of decene and co-oligomers of decene and dodecene. Preferred PAOs are available under the trade name SuperSyn™ PAO (ExxonMobil Chemical Company, Houston, Tex.).

Curing Agents and Accelerators

The compositions produced in accordance with the present invention typically contain other components and additives customarily used in rubber mixes, such as pigments, accelerators, cross-linking and curing materials, antioxidants, antiozonants, and fillers. In one embodiment, processing aids (resins) such as naphthenic, aromatic or paraffinic extender oils may be present from 1 to 30 phr. In another embodiment, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR*, RUBBER WORLD, P 18-23 (1991)). Cross-linking and curing agents include sulfur, zinc oxide, and fatty acids. Peroxide cure systems may also be used. Generally, polymer compositions may be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. (See also, *Formulation Design and Curing Characteristics of NBR Mixes for Seals*, RUBBER WORLD, P 25-30 (1993)). This method may be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In one embodiment of the invention, at least one curing agent is present from 0.2 to 15 phr, and from 0.5 to 10 phr in another embodiment. Curing agents include those components described above that facilitate or influence the cure of elastomers, such as metals, accelerators, sulfur, peroxides, and other agents common in the art, and as described above.

Processing

Blends of elastomers may be reactor blends and/or melt mixes. Mixing of the components may be carried out by combining the polymer components, filler and the clay in the form of an intercalate in any suitable mixing device such as a Banbury™ mixer, Brabender™ mixer or preferably a mixer/ extruder. Mixing is performed at temperatures in the range from up to the melting point of the elastomer and/or secondary rubber used in the composition in one embodiment, from 40° C. up to 250° C. in another embodiment, and from 100° C. to 200° C. in yet another embodiment, under conditions of shear sufficient to allow the clay intercalate to exfoliate and become uniformly dispersed within the polymer to form the nanocomposite.

Mixing may be performed in a BR Banbury™ internal mixer with, for example, tangential rotors, or, in a Krupp internal mixer with, for example, intermeshing rotors, by techniques known in the art. Typically, from 70% to 100% of the elastomer or elastomers is first mixed for 20 to 90 seconds, or until the temperature reaches from 40° C. to 60° C. Then, ¾ of the filler, and the remaining amount of elastomer, if any, is typically added to the mixer, and mixing continues until the temperature reaches from 90 to 150° C. Next, the remaining filler is added, as well as the processing oil, and mixing continues until the temperature reaches from 140 to 190° C. The finished mixture is then sheeted out on an open mill and allowed to cool, for example, to from 60° C. to 100° C. when the curatives are added. Curatives may be added on the open mill, or in a second pass in the internal mixer.

Mixing with the clays is performed by techniques known to those skilled in the art, wherein the clay is added to the polymer at the same time as the carbon black in one embodiment. The polybutene processing oil is typically added later in the mixing cycle after the carbon black and clay have achieved adequate dispersion in the elastomeric matrix.

The cured compositions of the invention can include various elastomers and fillers with the polybutene processing oil. The compositions of the invention typically include isobutylene-based elastomers such as halogenated poly(isobutylene-co-p-methylstyrene), butyl rubber, or halogenated star-branched butyl rubber (HSBB) either alone, or some combination with one another, with the polybutene processing oil being present from 5 to 30 phr in one embodiment.

In one embodiment, the composition is halogenated poly (isobutylene-co-p-methylstyrene) from 60 to 100 phr that may include natural rubber from 3 to 40 phr, and polybutene processing oil present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

In another embodiment, the composition may be a halogenated poly(isobutylene-co-p-methylstyrene) from 20 to 100 phr in one embodiment, and from 60 to 98 phr in another embodiment, and polybutene processing oil present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

In yet another embodiment, the composition may be a halogenated poly(isobutylene-co-p-methylstyrene) from 70 to 97 phr in one embodiment, and from 50 to 70 phr in another embodiment, and polybutene processing oil present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

The isobutylene-based elastomer useful in the invention can be blended with various other rubbers or plastics as disclosed herein, in particular thermoplastic resins such as nylons or polyolefins such as polypropylene or copolymers of polypropylene. These compositions are useful in air barriers such as bladders, innertubes, tire innerliners, air sleeves (such as in air shocks), diaphragms, as well as other applications where high air or oxygen retention is desirable. In one embodiment, the cured composition has an air (air, oxygen, or nitrogen at 60° C.) permeability of from $1.2 \times 10^{-8}$ to $4 \times 10^{-8}$ $cm^3$-$cm/cm^2$-sec-atm, and from $1.5 \times 10^{-8}$ to $3.5 \times 10^{-8}$ $cm^3$-$cm/cm^2$-sec-atm in another embodiment.

In one embodiment, an air barrier can be made by the method of combining at least one random copolymer comprising a $C_4$ to $C_7$ isomonoolefin derived unit, at least one filler, and polybutene oil having a number average molecular weight greater than 400, and at least one cure agent; and curing the combined components as described above.

INDUSTRIAL APPLICABILITY

The blends of the invention may be extruded, compression molded, blow molded, injection molded, and laminated into various shaped articles including fibers, films, layers, industrial parts such as automotive parts, appliance housings, consumer products, packaging, and the like.

In addition, the blends are useful in articles for a variety of tire applications such as truck tires, bus tires, automobile tires, motorcycle tires, off-road tires, aircraft tires, and the like. The blends may either serve as a material fabricated into a finished article or a component of a finished article such as an innerliner for a tire. The article may be selected from air barriers, air membranes, films, layers (microlayers and/or multilayers), innerliners, innertubes, treads, bladders, sidewalls, and the like.

All patents and patent applications, test procedures (such as ASTM methods), and other documents cited herein are fully incorporated by reference to the extent such disclosure is consistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

Test Methods

Cure properties were measured using an ODR 2000 and 3 degree arc, or a MDR 2000 and 0.5 degree arc at the indicated temperature. Test specimens were cured at the indicated temperature, typically from 150° C. to 160° C., for a time corresponding to t90+appropriate mold lag. When possible, standard ASTM tests were used to determine the cured compound physical properties (see Table 1). Stress/strain properties (tensile strength, elongation at break, modulus values, energy to break) were measured at room temperature using an Instron 4202. Shore A hardness was measured at room temperature by using a Zwick Duromatic. The error ($2\sigma$) in measuring 100% Modulus is ±0.11 MPa units; the error ($2\sigma$) in measuring elongation is ±13% units.

The values "mh" and "ml" used here and throughout the description refer to "maximum torque" and "minimum torque", respectively. The "MS" value is the Mooney scorch value, the "ML(1+4)" value is the Mooney viscosity value. The error ($2\sigma$) in the later measurement is ±0.65 Mooney viscosity units. The values of "t" are cure times in minutes, and "ts" is scorch time" in minutes.

Tensile measurements were done at ambient temperature on Instron Series IX Automated Materials Testing System 6.03.08. Tensile specimens (dog-bone shaped) width of 0.25 inches (0.62 cm) and a length of 1.0 inches (2.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported. The error ($2\sigma$) in tensile measurements is ±0.47 MPa units.

Oxygen permeability was measured using a MOCON OxTran Model 2/61 operating under the principle of dynamic measurement of oxygen transport through a thin film as published by Pasternak et al. in 8 JOURNAL OF POLYMER SCIENCE: PART A-2, P 467 (1970). The units of measure are cc-mil/$m^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

In an embodiment, the invention provides for an article comprising a composition comprising an effective amount of the at least one halogenated random copolymer to impart to the article a MOCON (as herein defined) of 37.5 cc-mil/$m^2$-day-mmHg or lower.

In an embodiment, the invention provides for an article comprising a composition comprising an effective amount of the at least one halogenated random copolymer to impart to the article a MOCON (as herein defined) of 35.0 cc-mil/$m^2$-day-mmHg or lower.

In an embodiment, the invention provides for an article comprising a composition comprising an effective amount of the at least one halogenated random copolymer to impart to the article a MOCON (as herein defined) of 32.5 cc-mil/$m^2$-day-mmHg or lower.

In an embodiment, the invention provides for an article comprising a composition comprising an effective amount of the at least one halogenated random copolymer to impart to the article a MOCON (as herein defined) of 30.0 cc-mil/$m^2$-day-mmHg or lower.

Permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\sigma$) in measuring air permeability is ±0.245 ($\times 10^8$) units.

Inflation Pressure Retention (IPR) was tested in accordance to ASTM F-1112 by the following method: The tires were mounted on standard rims and inflated to 240 kPa±3.5 kPa. A T-adapter is connected to the valve allowing a calibrated gauge to be connected to one side and inflation air to be added through the other. The tires are checked for leaks, conditioned for 48 hours @21° C.±3° C. for 48 hours and again checked for leaks. The inflation pressure is then recorded over a three month time frame. The IPR is reported as the inflation pressure loss per month.

In an embodiment, the tire may comprise an article comprising a composition comprising an effective amount of the at least one halogenated random copolymer to impart to the tire an Inflation Pressure Retention (IPR) (as herein defined) of 2.0 or lower.

In an embodiment, the tire may comprise an article comprising a composition comprising an effective amount of the at least one halogenated random copolymer to impart to the tire an Inflation Pressure Retention (IPR) (as herein defined) of 1.8 or lower.

In an embodiment, the tire may comprise an article comprising a composition comprising an effective amount of the at least one halogenated random copolymer to impart to the tire an Inflation Pressure Retention (IPR) (as herein defined) of 1.6 or lower.

The Intracarcass Pressure (ICP) is run as follows: The tires are mounted on standard rims and inflated to 240 kPa±3.5 kPa. The tires are connected to a constant inflation pressure system, which uses a calibrated gauge to maintain the inflation at 240 kPa±3.5 kPa. The tires are checked for leaks, conditioned for 48 hours @21° C.±3° C. and again checked for leaks. Typically five calibrated gauges with hypodermic needles are then inserted into the tire with the tip of the needle set on the carcass cord. The readings are taken until the pressure at the cord interface equilibrates (normally 2 months). The ICP is reported as the average of the readings.

In an embodiment, the tire may comprise an article comprising a composition comprising an effective amount of the at least one halogenated random copolymer to impart to the tire an Intracarcass (ICP) (as herein defined) of 80 or lower.

In an embodiment, the tire may comprise an article comprising a composition comprising an effective amount of the at least one halogenated random copolymer to impart to the tire an Intracarcass (ICP) (as herein defined) of 75 or lower.

In an embodiment, the tire may comprise an article comprising a composition comprising an effective amount of the at least one halogenated random copolymer to impart to the tire an Intracarcass (ICP) (as herein defined) of 70 or lower.

In an embodiment, the tire may comprise an article comprising a composition comprising an effective amount of the at least one halogenated random copolymer to impart to the tire an Intracarcass (ICP) (as herein defined) of 65 or lower.

In an embodiment, the tire may comprise an article comprising a composition comprising an effective amount of the at least one halogenated random copolymer to impart to the tire an Intracarcass (ICP) (as herein defined) of 60 or lower.

In an embodiment, the tire may comprise an article comprising a composition comprising an effective amount of the at least one halogenated random copolymer to impart to the tire an Intracarcass (ICP) (as herein defined) of 55 or lower.

The Tire Durability Test is run by mounting the tires on reinforced steel rims of standard size. The tires are inflated to 240 kPa±3.5 kPa using a 50/50 $O_2/N_2$ mixture and loaded on the test machine. The tires are run against a 28.5 cm wheel running at 84.5 km/hr in a room at 21° C.±3° C. The load is set using the 100% load for 207 kPa inflation as found in *The Tire Guide*. This normally gives a deflection of 30%. The tire is run for 1 hour at 50% load followed by 1 hour at 100% load. The inflation pressure is recorded and the pressure is adjusted to this level daily for the test duration.

In an embodiment, the tire may comprise an article comprising a composition comprising an effective amount of the at least one halogenated random copolymer to impart to the tire a Tire Durability (as herein defined) of 470 or higher.

In an embodiment, the tire may comprise an article comprising a composition comprising an effective amount of the at least one halogenated random copolymer to impart to the tire a Tire Durability (as herein defined) of 500 or higher.

In an embodiment, the tire may comprise an article comprising a composition comprising an effective amount of the at least one halogenated random copolymer to impart to the tire a Tire Durability (as herein defined) of 550 or higher.

In an embodiment, the tire may comprise an article comprising a composition comprising an effective amount of the at least one halogenated random copolymer to impart to the tire a Tire Durability (as herein defined) of 600 or higher.

Figure 1:
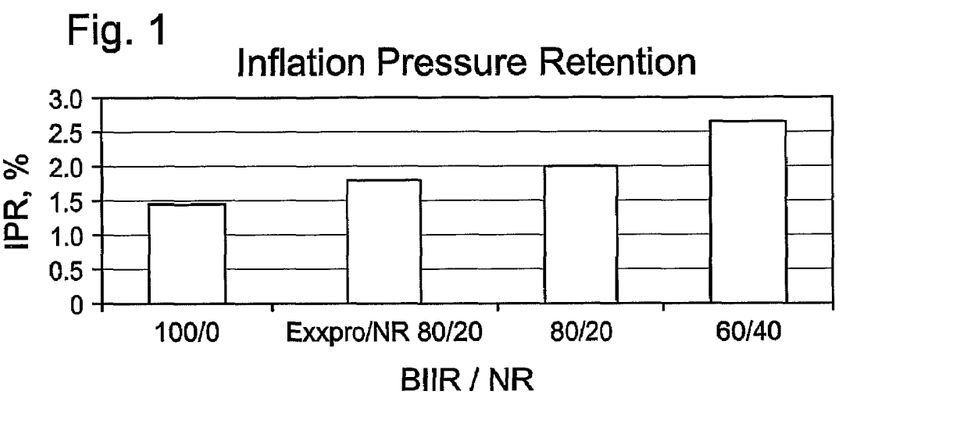
FIG. 1 shows a comparison of an inventive blend, one embodiment of the invention, as compared to blends commonly practiced in industry in terms of Inflation Pressure Retention (IPR).
Figure 2:
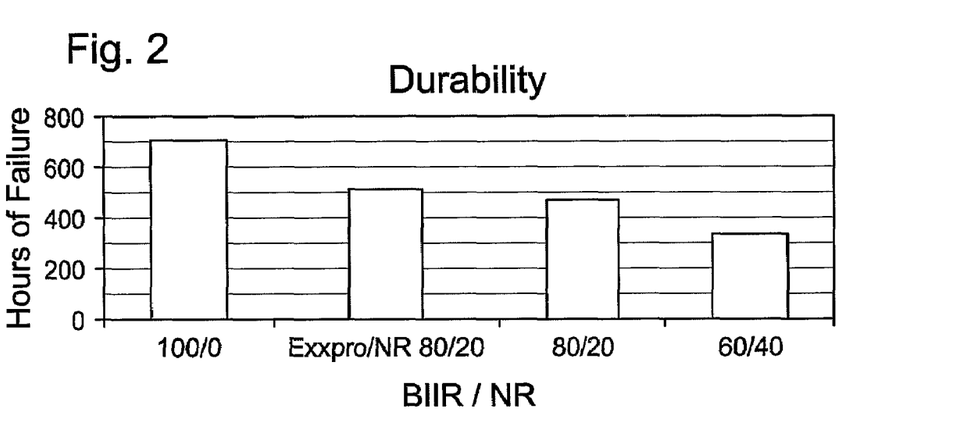
FIG. 2 shows a comparison of an inventive blend, one embodiment of the invention, as compared to blends commonly practiced in industry in terms of Tire Durability.
Figure 3:
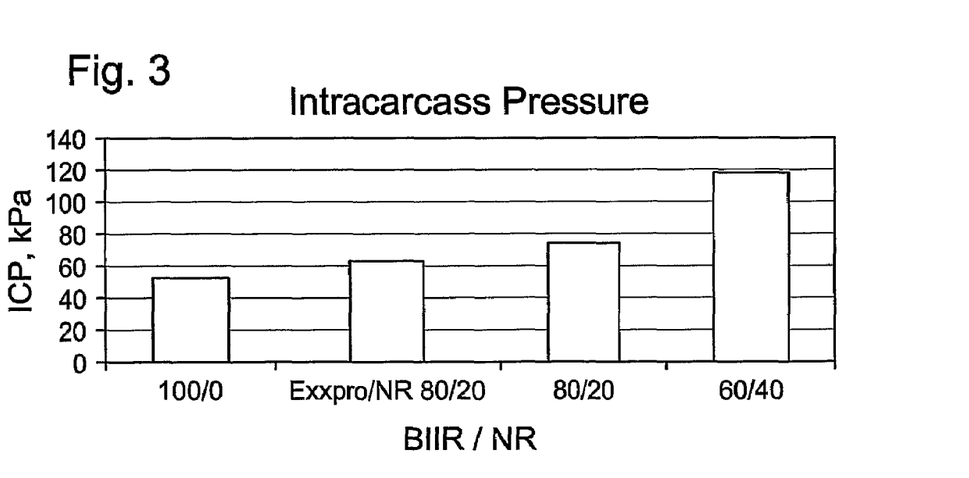
FIG. 3 shows a comparison of an inventive blend, one embodiment of the invention, as compared to blends commonly practiced in industry in terms of Intracarcass Pressure (ICP).

FIGS. 1, 2, and 3 show that a tire made with an innerliner comprising an EXXPRO™/NR blend (80% EXXPRO™) affords better performance than the tire made with an innerliner having a Bromobutyl rubber/NR blend of the same ratio (80% BIIR). The values obtained for the tire with an EXXPRO™ innerliner approaches values predicted for a tire having an innerliner made with a 90/10 Bromobutyl/NR blend. Blending the EXXPRO™ elastomer with a secondary rubber component, i.e. natural rubber, affords a compound with similar processing properties as the 100% Bromobutyl rubber innerliner compound.

Compositions 1-11 were mixed in a laboratory mixer in two steps using a Krupp GK 1.6-liter internal mixer with intermeshing rotors. Compositions 1-11 were press cured.

Compositions 1-4 (Table 3) are comparative controls. Compositions 5-11 (Table 3) exemplify the benefits of incorporating blends of isobutylene copolymers comprising a halomethylstyrene moiety. Compositions 5 thru 11 represent copolymers of halogenated poly(isobutylene-co-p-methylstyrene) comprising various amounts of halogenation and amounts of p-methylstyrene (PMS) (see Table 2).

Compositions 5-6 exemplify the use of EXXPRO™ elastomers having a PMS level of 5 wt % relative to the copolymer as a whole. These data show that the addition of the PMS improves the air barrier qualities compared to the copolymer alone, compositions 1-4. Compositions 7-9 exemplify the use of EXXPRO™ elastomers having a PMS level higher than 5 wt % relative to the copolymer. These data show that the addition of higher amounts of the PMS further improves the air barrier qualities compared to the copolymer alone, compositions 1-4, or to the EXXPRO™ elastomers having a PMS level of 5 wt %, compositions 5-6. Compositions 10-11 exemplify the use of EXXPRO™ elastomers having a BrPMS level higher than 0.85 mole % (see Table 2). These data show that the addition of higher amounts of the BrPMS further improves the air barrier qualities compared to the copolymer alone, compositions 1-4, or of the EXXPRO™ elastomers having the same PMS level and 0.85 mole % BrPMS, composition 7.

TABLE 1

| Parameter | Units | Test |
|---|---|---|
| | Test Methods | |
| Mooney Viscosity (polymer) | ML 1 + 8, 125° C., MU | ASTM D1646 |
| Mooney Viscosity (composition) | ML 1 + 4, 100° C., MU | ASTM D1646 |
| MOCON (@ 60° C.) | cc-mil/m$^2$-day-mmHg | See text |
| Air permeability (@ 65° C.) | cm$^3$-cm/cm$^2$-sec-atm | See text |
| Mooney Scorch Time | ts5, 125° C., minutes | ASTM D1646 |
| Oscillating Disk Rheometer (ODR) @ 160° C., ±3°arc | | |
| Moving Die Rheometer (MDR) @ 160° C., ±0.5°arc | | ASTM D2084 |
| ml | deciNewton.meter | |
| mh | dNewton.m | |
| ts2 | minute | |
| t50 | minute | |
| t90 | minute | |
| Physical Properties press cured Tc 90 + 2 min @ 160° C. | | |
| Hardness | Shore A | ASTM D2240 |
| Modulus 20%, 100%, 300% | MPa | ASTM D412 die C |
| Tensile Strength | MPa | |
| Elongation at Break | % | |
| Energy to Break | N/mm (J) | |
| Hot Air Aging, 72 hrs. @ 125° C. | | ASTM D573 |
| Hardness | Shore A | |
| Modulus 20%, 100%, 300% | MPa | |
| Tensile Strength | MPa | |
| Elongation at Break | % | |
| Energy to Break | N/mm (J) | |
| DeMattia Flex | mm @ kilocycles | ASTM D813 modified |

Compositions 12-19 were mixed in the laboratory in two steps using a Krupp GK 1.6-liter internal mixer with intermeshing rotors. Compositions 12-19 were press cured.

Composition 12 (Table 5) is a comparative control. Compositions 13-19 (Table 5) exemplify the use of EXXPRO™ elastomers having various PMS levels relative to the copolymer as a whole and a filler system consisting of carbon black and clay. Overall, the air permeability improves upon addition of an exfoliating clay (Table 6).

TABLE 2

Components and Commercial Sources

| Component | Brief Description | Commercial Source |
| --- | --- | --- |
| Bromobutyl 2222 | Brominated Poly(isobutylene-co-isoprene), Mooney Viscosity (1 + 8, 125° C.) of from 27-37 MU | ExxonMobil Chemical Company (Houston, TX) |
| Bromobutyl 2255 | Brominated Poly(isobutylene-co-isoprene), Mooney Viscosity (1 + 8, 125° C.) of from XX-XX MU | ExxonMobil Chemical Company (Houston, TX) |
| HSBB | Brominated star-branched Bromobutyl Rubber 6222 | ExxonMobil Chemical Company (Houston, TX) |
| Chlorobutyl 1066 | Chloronated Poly(isobutylene-co-isoprene), Mooney Viscosity (1 + 8, 125° C.) of from XX-XX MU | ExxonMobil Chemical Company (Houston, TX) |
| EXXPRO ™ 89-1 | 5 wt % PMS, 0.75 mol % BrPMS, Mooney viscosity of 35 ± 5 MU (1 + 8, 125° C.) | ExxonMobil Chemical Company (Houston, TX) |
| EXXPRO ™ 89-4 | 5 wt % PMS, 0.75 mol % BrPMS, Mooney viscosity of 45 ± 5 MU (1 + 8, 125° C.) | ExxonMobil Chemical Company (Houston, TX) |
| EXXPRO ™ 01-4 | 7.5 wt % PMS, 0.85 mol % BrPMS, Mooney viscosity of 45 ± 5 MU (1 + 8, 125° C.) | ExxonMobil Chemical Company (Houston, TX) |
| EXXPRO ™ 01-5 | 10 wt % PMS, 0.85 mol % BrPMS, Mooney viscosity of 45 ± 5 MU (1 + 8, 125° C.) | ExxonMobil Chemical Company (Houston, TX) |
| EXXPRO ™ 96-4 | 12 wt % PMS, 0.85 mol % BrPMS, Mooney viscosity of 45 ± 5 MU (1 + 8, 125° C.) | ExxonMobil Chemical Company (Houston, TX) |
| EXXPRO ™ 02-2 | 7.5 wt % PMS, 1.75 mol % BrPMS, Mooney viscosity of 45 ± 5 MU (1 + 8, 125° C.) | ExxonMobil Chemical Company (Houston, TX) |
| EXXPRO ™ 90-10 | 7.5 wt % PMS, 1.2 mol % BrPMS, Mooney viscosity of 45 ± 5 MU (1 + 8, 125° C.) | ExxonMobil Chemical Company (Houston, TX) |
| N660 | Carbon black | Sid Richardson Carbon Company (Fort Worth, TX) |
| CALSOL ™ 810 | Naphthenic Oil ASTM Type 103 | R.E. Carroll, Inc (Trenton, NJ) |
| CLOISITE ™ 20A | Dimethylditallowammonium chloride modified montmorillonite clay | Southern Clay Products (Gonzalez, TX) |
| Struktol 40MS | Aromatic hydrocarbon resin mixture | Struktol Co. of America (Stow, OH) |
| SP-1068 | Brominated phenol-formaldehyde resin | Schenectady International (Schenectady, NY) |
| Stearic acid | Cure agent | e.g., C.K. Witco Corp. (Taft, LA) |
| Sulfur | Cure agent | e.g., R.E. Carroll (Trenton, NJ) |
| MBTS | Cure accelerator | e.g., R.T. Vanderbilt (Norwalk, CT) |
| Zinc Oxide 911 | Cure activator | C.P. Hall (Chicago, IL) |

TABLE 3

Components of Comparative and Example Compositions 1-11

| Compound: | 1 | 2 | 3 | 4 | 5 | 6 | 7 | 8 | 9 | 10 | 11 |
|---|---|---|---|---|---|---|---|---|---|---|---|
| BIIR 2222 | 100 | | | | | | | | | | |
| BIIR 2255 | | 100 | | | | | | | | | |
| SBB 6222 | | | 100 | | | | | | | | |
| CIIR 1066 | | | | 100 | | | | | | | |
| Exxpro MDX 89-1 | | | | | 100 | | | | | | |
| Exxpro MDX 89-4 | | | | | | 100 | | | | | |
| Exxpro MDX 01-4 | | | | | | | 100 | | | | |
| Exxpro MDX 01-5 | | | | | | | | 100 | | | |
| Exxpro MDX 96-4 | | | | | | | | | 100 | | |
| Exxpro MDX 90-10 | | | | | | | | | | 100 | |
| Exxpro MDX 02-2 | | | | | | | | | | | 100 |
| Carbon Black, N660 | 60 | 60 | 60 | 60 | 60 | 60 | 60 | 60 | 60 | 60 | 60 |
| SP-1068 | 4 | 4 | 4 | 4 | 4 | 4 | 4 | 4 | 4 | 4 | 4 |
| Struktol 40MS | 7 | 7 | 7 | 7 | 7 | 7 | 7 | 7 | 7 | 7 | 7 |
| Processing Oil, Calsol 810 | 8 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 | 1 |
| Zinc Oxide, Kadox 911 | 1 | 1 | 1 | 1 | 1 | 1 | 1 | 1 | 1 | 1 | 1 |
| Sulfur | 0.5 | 0.5 | 0.5 | 0.5 | 0.5 | 0.5 | 0.5 | 0.5 | 0.5 | 0.5 | 0.5 |
| MBTS | 1.25 | 1.25 | 1.25 | 1.25 | 1.25 | 1.25 | 1.25 | 1.25 | 1.25 | 1.25 | 1.25 |

TABLE 4

Properties of Comparative and Example Compositions 1-11

| Compound: | 1 | 2 | 3 | 4 | 5 | 6 | 7 | 8 | 9 | 10 | 11 |
|---|---|---|---|---|---|---|---|---|---|---|---|
| ODR 2000 @160 C. | | | | | | | | | | | |
| ml, dN·m | 7.9 | 11.4 | 7.1 | 9.9 | 8.5 | 10.3 | 11.1 | 10.8 | 9.8 | 11.9 | 12.0 |
| mh, dN·m | 26.8 | 32.5 | 22.5 | 21.0 | 26.7 | 35.0 | 37.4 | 37.1 | 26.2 | 57.8 | 99.4 |
| ts2, minutes | 3.1 | 2.5 | 3.6 | 1.6 | 4.7 | 4.1 | 3.9 | 4.1 | 4.2 | 3.4 | 2.6 |
| t50, minutes | 5.6 | 4.8 | 5.9 | 2.4 | 8.0 | 7.4 | 7.4 | 7.5 | 7.0 | 6.5 | 4.8 |
| t90, minutes | 13.5 | 14.5 | 10.8 | 3.5 | 12.0 | 10.8 | 11.1 | 11.1 | 11.4 | 9.3 | 15.8 |
| Viscosity, ML(1 + 4)@100 C. | 49.6 | 61.0 | 49.1 | 51.4 | 54.9 | 58.2 | 60.0 | 59.6 | 55.9 | 61.2 | 60.2 |
| Scorch @135 C., t5 | 14.7 | 11.4 | 15.0 | 10.4 | 19.6 | 16.5 | 14.2 | 18.9 | 18.6 | 14.1 | 8.7 |
| MOCON | 29.4 | 29.0 | 29.8 | 26.7 | 25.4 | 25.5 | 23.8 | 22.9 | 22.7 | 21.7 | 21.6 |
| Relative to Cmp 1 | 1.00 | 0.99 | 1.02 | 0.91 | 0.86 | 0.87 | 0.81 | 0.78 | 0.77 | 0.74 | 0.74 |
| Hardness, Shore A | 41.5 | 41.9 | 42.5 | 36.5 | 47.3 | 49.7 | 50.5 | 50.5 | 50.5 | 57.1 | 70.3 |
| Stress/Strain | | | | | | | | | | | |
| 20% Modulus, MPa | 0.47 | 0.53 | 0.53 | 0.46 | 0.58 | 0.65 | 0.63 | 0.62 | 0.65 | 0.83 | 1.21 |
| 100% Modulus, MPa | 0.91 | 10.8 | 0.97 | 0.79 | 1.3 | 1.58 | 1.62 | 1.66 | 1.73 | 2.82 | 80.3 |
| 300% Modulus, MPa | 2.87 | 3.68 | 3.01 | 2.44 | 3.81 | 4.92 | 5.21 | 5.28 | 4.45 | 8.35 | 0 |
| Tensile, MPa | 9.4 | 10.9 | 8.8 | 7.7 | 9.3 | 10.1 | 10.3 | 10.2 | 9.2 | 11.0 | 12.7 |
| Elongation, % | 829 | 793 | 817 | 810 | 885 | 793 | 763 | 760 | 839 | 491 | 180 |
| Energy to break, N/mm | 10.5 | 13.2 | 10.2 | 9.2 | 14.5 | 15.4 | 15.9 | 15.7 | 13.9 | 9.3 | 4.4 |
| DeMattia Flex Growth | | | | | | | | | | | |
| Kcycles | 1724 | 1724 | 1724 | 1724 | 1724 | 1724 | 1760 | 1760 | 1760 | 451 | 51 |
| Crack Length, mm | 10.2 | 12.7 | 7.9 | 4.3 | 7.6 | 18.4 | 23.6 | 20.9 | 8.5 | 25 | 25 |
| Adhesion | | | | | | | | | | | |
| Tear Resistance, N/mm | 14.4 | 16.7 | 6.3 | 7.1 | 0.9 | 0.8 | 0.9 | 0.6 | 0.7 | 9.7 | 1.7 |

TABLE 5

Components of Comparative and Example Compositions 12-19

| Compound: | 12 | 13 | 14 | 15 | 16 | 17 | 18 | 19 |
|---|---|---|---|---|---|---|---|---|
| BIIR 2222 | 100 | | | | | | | |
| Exxpro MDX 89-1 | | 100 | | | | | | |
| Exxpro MDX 89-4 | | | 100 | | | | | |
| Exxpro MDX 01-4 | | | | 100 | | | | |
| Exxpro MDX 01-5 | | | | | 100 | | | |
| Exxpro MDX 96-4 | | | | | | 100 | | |
| Exxpro MDX 90-10 | | | | | | | 100 | |
| Exxpro MDX 02-2 | | | | | | | | 100 |
| Carbon Black, N660 | 55 | 55 | 55 | 55 | 55 | 55 | 55 | 55 |

TABLE 5-continued

Components of Comparative and Example Compositions 12-19

| Compound: | 12 | 13 | 14 | 15 | 16 | 17 | 18 | 19 |
|---|---|---|---|---|---|---|---|---|
| Closite 20A | 5 | 5 | 5 | 5 | 5 | 5 | 5 | 5 |
| SP-1068 | 4 | 4 | 4 | 4 | 4 | 4 | 4 | 4 |
| Struktol 40MS | 7 | 7 | 7 | 7 | 7 | 7 | 7 | 7 |
| Processing Oil, Calsol 810 | 8 | 8 | 8 | 8 | 8 | 8 | 8 | 8 |
| Stearic acid | 1 | 1 | 1 | 1 | 1 | 1 | 1 | 1 |
| Zinc Oxide, Kadox 911 | 1 | 1 | 1 | 1 | 1 | 1 | 1 | 1 |
| Sulfur | 0.5 | 0.5 | 0.5 | 0.5 | 0.5 | 0.5 | 0.5 | 0.5 |
| MBTS | 1.25 | 1.25 | 1.25 | 1.25 | 1.25 | 1.25 | 1.25 | 1.25 |

TABLE 6

Properties of Comparative and Example Compositions 12-19

| Compound: | 12 | 13 | 14 | 15 | 16 | 17 | 18 | 19 |
|---|---|---|---|---|---|---|---|---|
| ODR@160 C. | | | | | | | | |
| ml, dN · m | 7.6 | 9.6 | 11.0 | 11.8 | 11.6 | 9.9 | 13.2 | 12.7 |
| mh, dN · m | 31.0 | 27.5 | 36.1 | 37.4 | 37.3 | 25.7 | 56.9 | 89.8 |
| ts2, minutes | 4.1 | 4.4 | 4.6 | 3.8 | 4.3 | 4.8 | 3.3 | 2.8 |
| t50, minutes | 9.4 | 11.1 | 11.6 | 10.7 | 11.3 | 10.2 | 9.7 | 7.3 |
| t90, minutes | 16.9 | 19.3 | 19.3 | 18.8 | 19.5 | 18.3 | 15.2 | 15.9 |
| Viscosity, ML(1 + 4)@100 C. | 45.4 | 51.2 | 54.9 | 56.3 | 56.6 | 51.9 | 59.7 | 56.6 |
| Scorch @ 135 C., t5, minutes | 16.0 | 5.8 | 6.6 | 5.5 | 5.4 | 6.1 | 4.4 | 4.6 |
| MOCON | 29.0 | 29.4 | 23.4 | 22.9 | 22.2 | 21.4 | 20.6 | 20.7 |
| Relative to Cmp 1 | 0.99 | 0.97 | 0.80 | 0.78 | 0.75 | 0.73 | 0.70 | 0.70 |
| Hardness, Shore A | 45.9 | 47.7 | 50.3 | 51.1 | 49.9 | 50.9 | 57.9 | 68.7 |
| Stress/Strain | | | | | | | | |
| 20% Modulus, MPa | 0.56 | 0.64 | 0.71 | 0.69 | 0.7 | 0.72 | 0.69 | 1.17 |
| 100% Modulus, MPa | 1.14 | 1.48 | 1.76 | 1.73 | 1.78 | 1.67 | 2.91 | 6.95 |
| 300% Modulus, MPa | 3.4 | 4.12 | 5.1 | 5.31 | 5.49 | 4.27 | 8.71 | 0 |
| Tensile, MPa | 10.4 | 9.9 | 11.1 | 11.4 | 11.2 | 10.1 | 11.9 | 12.7 |
| Elongation, % | 775 | 778 | 739 | 701 | 693 | 861 | 476 | 221 |
| Energy to break, N/mm | 11.5 | 12.7 | 12.8 | 13.3 | 13.4 | 14.4 | 9.8 | 5.7 |
| DeMattia Flex-Growth | | | | | | | | |
| Kcycles | 899 | 1724 | 1724 | 1760 | 1343 | 1760 | 51 | 51 |
| Crack Length, mm | 25 | 11.4 | 25 | 22.1 | 25 | 9.5 | 25 | 25 |
| Adhesion | | | | | | | | |
| Tear Resistance, N/mm | 4.9 | 4.5 | 4.6 | 6.0 | 7.2 | 3.1 | 8.2 | 1.3 |

Compositions 20-24 were mixed in a tire factory using a conventional two-step mixing sequence in internal mixers equipped with tangential rotors. Masterbatch mixing was completed using a GK400 mixer followed by sheeting out on an extruder with roller die. Finalization was completed in a GK160 mixer and stocks sheeted out on a two-roll mill. A cold-feed pin extruder was used to profile each innerliner compound. Compositions 20-23 (Table 7) are comparative controls. Composition 24 (Table 7) exemplifies the benefits of incorporating blends of isobutylene copolymers comprising a halomethylstyrene moiety. Composition 24 exemplifies the use of EXXPRO™ elastomers having a PMS level of 10 wt % relative to the copolymer as a whole. These data show that the addition of the PMS improves the air barrier qualities of the polymer blends compared to the copolymer alone, compare to compositions 21 and 23.

Furthermore, physical property data (hardness, modulus, tensile strength, elongation, energy to break) data show that the addition of the PMS improves the aging corresponding properties since the %-change from original properties (100%) are the lowest of the copolymer blends, compare composition 24 to compositions 21 and 23.

Compositions 20-24 were incorporated into a tire as the innerliners. All other tire components were factory production materials. P205/60 SR15 passenger tires were built using automatic building machines and were press cured. Tires were tested for inflation pressure retention (IPR), intracarcass pressure (ICP), and durability (Table 9). Methods and equipment used to manufacture the innerliners and tires are well known in the art. (See, e.g., U.S. Pat. Nos. 6,834,695, 6,832, 637, 6,830,722, 6,822,027, 6,814,116, 6,805,176, 6,802,922, 6,802,351, 6,799,618, 6,796,348, 6,796,347, 6,617,383, 6,564,625, and 6,538,066). The invention is not limited to any particular method of manufacture for articles such as innerliners or tires. These data show that the addition of the PMS, composition 24, improves the air barrier qualities (IPR and ICP) and the durability compared to the copolymer blends alone, compositions 21 and 23.

TABLE 7

Components of Comparative and Example Compositions 20-24

| Compound: | 20 | 21 | 22 | 23 | 24 |
|---|---|---|---|---|---|
| BIIR 2222 | 100 | 80 | 60 | | |
| CIIR 1068 | | | | 80 | |
| Exxpro MDX 01-5 | | | | | 80 |
| NR, SMR20 | — | 20 | 40 | 20 | 20 |
| Carbon Black, N660 | 60 | 60 | 60 | 60 | 60 |
| Resin, SP1068 | 4 | 4 | 4 | 4 | 4 |
| Resin, Struktol 40 MS | 7 | 7 | 7 | 7 | 7 |
| Process oil, Calsol 810 | 8 | 8 | 8 | 8 | 8 |
| Stearic Acid | 1 | 1 | 1 | 1 | 1 |
| Zinc oxide, Kadox 911 | 1 | 1 | 1 | 1 | 1 |
| Sulfur | 0.5 | 0.5 | 0.5 | 0.5 | 0.5 |
| MBTS | 1.25 | 1.25 | 1.25 | 1.25 | 1.25 |

TABLE 8

Properties of Comparative and Example Compositions 20-24

| Compound: | 20 | 21 | 22 | 23 | 24 |
|---|---|---|---|---|---|
| MDR @160 C, 0.5° arc | | | | | |
| ml, dN · m | 1.64 | 1.56 | 1.49 | 1.53 | 2.12 |
| mh, dN · m | 4.75 | 4.9 | 5.91 | 5.08 | 6.84 |
| ts2, minutes | 5.23 | 5.25 | 5.18 | 3.95 | 5.67 |
| t50, minutes | 3.95 | 4.67 | 5.46 | 3.68 | 6.02 |
| t90, minutes | 18.97 | 9.34 | 11.31 | 7.64 | 9.86 |
| Mooney viscosity, ML(1 + 4)@100 C. | 62.7 | 57.5 | 54.4 | 56.8 | 75.8 |
| Mooney Scorch@ 135° C., t5, minutes | 9.48 | 9.45 | 7.05 | 11.8 | 9.83 |
| MOCON | 24.7 | 39.3 | 59.8 | 41.8 | 34.7 |
| Relative to Cmp 20 | 0.10 | 0.16 | 0.24 | 0.17 | 0.14 |
| Hardness, Shore A | 44 | 44 | 45 | 42 | 49 |
| Stress/Strain | | | | | |
| 100% Modulus (MPa) | 1.1 | 1.0 | 1.1 | 0.9 | 1.6 |
| 300% Modulus (MPa) | 3.9 | 3.5 | 3.9 | 3.2 | 5.5 |
| Tensile, Mpa | 10.1 | 9.5 | 11.7 | 10.5 | 12.3 |
| Elongation, % | 771 | 747 | 692 | 800 | 683 |
| Energy to break, N/mm | 11.8 | 9.2 | 10.3 | 10.2 | 14.1 |
| Adhesion @ 100 C. | | | | | |
| Tear Resistance, N/mm | 24.3 | 26.9 | 26.9 | 22.3 | 28.7 |
| Aged 72 hrs@125° C. | | | | | |
| Aged Hardness, Shore A | 52 | 56 | 53 | 59 | 53 |
| % Change | 16% | 21% | 15% | 29% | 7% |
| Aged Stress/Strain | | | | | |
| 100% Modulus (MPa) | 2.0 | 2.1 | 1.9 | 2.2 | 2.6 |
| % Change | 43% | 50% | 41% | 57% | 38% |
| 300% Modulus (MPa) | 5.9 | 5.5 | 4.9 | 5.4 | 7.5 |
| % Change | 33% | 37% | 21% | 41% | 27% |
| Tensile, Mpa | 7.7 | 7.2 | 5.6 | 6.1 | 10.2 |
| % Change | −31% | −32% | −111% | −72% | −21% |
| Elongation, % | 524 | 466 | 372 | 376 | 461 |
| % Change | −47% | −60% | −86% | −113% | −48% |
| Energy to break, N/mm | 6.7 | 5.8 | 3.1 | 4.0 | 8.9 |
| % Change | −77% | −58% | −235% | −156% | −59% |

A P205/60 SR15 passenger tire made with an innerliner made from an EXXPRO™/NR blend (80% EXXPRO™) affords better performance than the tire made with an innerliner having a Bromobutyl rubber/NR blend of the same ratio (80% BIIR). The values obtained for the tire with an EXXPRO™ innerliner approaches values predicted for a tire having an innerliner made with a 90/10 BIIR/NR blend. Blending the EXXPRO™ elastomer with a secondary rubber component, i.e. natural rubber, affords a compound with similar processing properties as the 100% Bromobutyl rubber innerliner compound.

TABLE 9

Tire IPR, ICP and Durability Data

| Compound | IPR | ICP | Durability |
|---|---|---|---|
| 20 | 1.45 | 52.3 | 708.2 |
| 21 | 2.00 | 73.7 | 469.5 |
| 22 | 2.65 | 118.7 | 336.1 |
| 23 | 2.35 | 81.6 | 340 |
| 24 | 1.80 | 63 | 511.6 |

Compositions 25-30 were mixed in a tire factory using a conventional two-step mixing sequence in internal mixers equipped with tangential rotors. First step masterbatch mixing was completed using a GK400 mixer followed by sheeting out on an extruder with roller die. Second step finalization was completed in a GK160 mixer and stocks sheeted out on a two-roll mill. A cold-feed pin extruder was used to profile each innerliner compound. Compositions 25-27 (Table 10) are comparative controls. Compositions 28-30 (Table 10) exemplify the benefits of incorporating blends of isobutylene copolymers comprising a halomethylstyrene moiety. Compositions 28-30 exemplify the use of EXXPRO™ elastomers having a PMS level of 10 wt % relative to the copolymer as a whole. Compositions 25 and 28 do not contain a secondary elastomer. Compositions 26 and 29 contain 20 phr of natural rubber as a secondary elastomer. Compositions 27 and 30 contain 40 phr of natural rubber as a secondary elastomer.

Data (Table 11) show that the addition of the PMS generally improves the air barrier qualities of the polymer blends compared to the copolymer alone, compare respective compositions 25 and 28, 26 and 29, and 27 and 30.

Physical property data show that the addition of the PMS improves the processing properties of the polymer blends compared to the polymer alone. Mooney scorch values have a higher %-increase than do the MDR t50 and t90 cure properties, compare respective compositions 25 and 28, 26 and 29, and 27 and 30.

Furthermore, physical property data show that the addition of the PMS along with use of a secondary elastomer improves the processing properties of the polymer blends compared to the polymer alone. Mooney scorch values have a higher %-increase than do the MDR ts2 scorch and MDR t50 and t90 cure properties, compare respective compositions 25 and 28, 26 and 29, and 27 and 30. Mooney viscosity values of the EXXPRO™/NR blends are lower than for the 100% Bromobutyl rubber innerliner, compare compositions 29 and 30 to composition 25.

TABLE 10

Components of Comparative and Example Compositions 25-30

| Compound | 25 | 26 | 27 | 28 | 29 | 30 |
|---|---|---|---|---|---|---|
| BIIR 2222 | 100 | 80 | 60 | | | |
| NR, SMR 20 | | 20 | 40 | | 20 | 40 |
| Exxpro MDX 01-5 | | | | 100 | 80 | 60 |
| SP1068 | 4 | 4 | 4 | 4 | 4 | 4 |
| Carbon Black, N660 | 60 | 60 | 60 | 60 | 60 | 60 |
| Strucktol 40 MS | 7 | 7 | 7 | 7 | 7 | 7 |
| Processing Oil, TDAE | 8 | 8 | 8 | 8 | 8 | 8 |
| Stearic Acid | 1 | 1 | 1 | 1 | 1 | 1 |

TABLE 10-continued

Components of Comparative and Example Compositions 25-30

| Compound | 25 | 26 | 27 | 28 | 29 | 30 |
|---|---|---|---|---|---|---|
| Zinc Oxide | 1 | 1 | 1 | 1 | 1 | 1 |
| Sulfur | 0.5 | 0.5 | 0.5 | 0.5 | 0.5 | 0.5 |
| MBTS | 1.25 | 1.25 | 1.25 | 1.25 | 1.25 | 1.25 |

TABLE 11

Properties of Comparative and Example Compositions 25-30

|  | 100 BIIR 25 | 80 BIIR 26 | 60 BIIR 27 | 100 Exxpro 28 | 80 Exxpro 29 | 60 Exxpro 30 |
|---|---|---|---|---|---|---|
| MDR @160° C., 0.5 arc |  |  |  |  |  |  |
| ml, dN · m | 1.71 | 1.47 | 1.49 | 1.57 | 1.76 | 1.72 |
| mh, dN · m | 4.87 | 5.15 | 6.02 | 6.77 | 6.27 | 6.61 |
| ts2, minutes | 4.38 | 5.13 | 5.04 | 4.53 | 5.6 | 5.55 |
| t50, minutes | 3.51 | 4.87 | 5.4 | 5.04 | 5.92 | 6.27 |
| t90, minutes | 8.08 | 9.4 | 11.03 | 8.39 | 10.46 | 14.39 |
| Mooney viscosity, ML(1 + 4) @100° C. | 78.2 | 58.5 | 54.2 | 70.1 | 70.2 | 63.6 |
| Mooney scorch @135° C., t5, minutes | 7.78 | 6.52 | 6.33 | 13.4 | 11.63 | 13.95 |
| MOCON | 24.4 | 37.5 | 55.8 | 20.5 | 32.5 | 54.3 |
| Air Permeability | 2.78 | 3.05 | 5.00 | 2.46 | 2.87 | 3.77 |
| Hardness, Shore A | 48 | 47 | 47 | 54 | 48 | 51 |
| Stress/Strain |  |  |  |  |  |  |
| 100% Modulus, MPa | 1.39 | 1.16 | 1.17 | 1.93 | 1.57 | 1.47 |
| 300% Modulus, MPa | 4.69 | 3.90 | 4.16 | 5.87 | 5.57 | 5.22 |
| Tensile, MPa | 10.54 | 10.68 | 12.37 | 11.21 | 11.83 | 13.01 |
| Elongation, % | 746.9 | 777.6 | 721.3 | 780.7 | 715.5 | 715.8 |
| Energy to break, N/mm | 15.95 | 13.39 | 12.47 | 18.17 | 16.06 | 15.09 |
| Adhesion @100° C., Tear Resistance, N/mm | 13.10 | 9.68 | 10.59 | 4.42 | 4.49 | 6.19 |
| Corresponding Change, % |  |  |  | −66.3 | −53.6 | −42.4 |
| Fatigue to Failure, cycles | 610,442 | 324,694 | 127,864 | 357,860 | 231,268 | 87,099 |
| Corresponding Change, % |  |  |  | −41.4 | −28.8 | −31.9 |
| Aged 72 hrs @125° C. |  |  |  |  |  |  |
| Aged Hardness, Shore A | 50 | 51 | 47 | 58 | 53 | 48 |
| Aged Stress/Strain |  |  |  |  |  |  |
| 100% Modulus, MPa | 1.96 | 1.86 | 1.69 | 2.96 | 2.74 | 1.95 |
| % Change | 41% | 60% | 44% | 53% | 74% | 33% |
| 300% Modulus, MPa | 6.39 | 5.53 | 5.11 | 8.49 | 8.09 | 6.34 |
| % Change | 36% | 42% | 23% | 45% | 45% | 12% |
| Tensile, MPa | 9.24 | 8.13 | 7.12 | 11.66 | 10.86 | 8.98 |
| % Change | −12% | −24% | −42% | 4% | −8% | −31% |
| Elongation, % | 593.8 | 564.2 | 463.1 | 534.2 | 514.4 | 480.0 |
| % Change | −21% | −17% | −36% | −31% | −28% | −33% |
| Energy to break, N/mm | 12.11 | 8.63 | 5.50 | 13.17 | 11.14 | 7.81 |
| % Change | −8% | −35% | −56% | −28% | −30% | −48% |

Compositions 25-30 were incorporated into a tire as the inner liners using automated building machines. All other tire components were normal production materials. Tires were press cured. Compositions 25-30 were incorporated into a P205/60 SR15 passenger tire. Tires were tested for inflation pressure retention (IPR) and intracarcass pressure (ICP) (Table 12). These data show that the addition of the PMS, compositions 28-30, improves the respective air barrier qualities (IPR) compared to the copolymer blends alone, compositions 20-22 (Table 9) and compositions 25-27 (Table 12).

TABLE 12

Tire IPR and ICP Data

| Compound | IPR | ICP |
|---|---|---|
| 25 | 1.45 | 57.8 |
| 26 | 2.00 | 76.5 |
| 27 | 2.65 | 108.8 |
| 28 | 1.32 | 55.8 |

TABLE 12-continued

Tire IPR and ICP Data

| Compound | IPR | ICP |
|---|---|---|
| 29 | 1.66 | 78.2 |
| 30 | 2.56 | 117.4 |

Tires made with an innerliner comprising the use of EXXPRO™ elastomers having a PMS level of 10 wt % relative to the copolymer as a whole affords better performance than the tires made with an innerliner having a Bromobutyl rubber innerliner having the lowest measured IPR and ICP values.

Tires made with an innerliner comprising the use of EXXPRO™ elastomers having a PMS level of 10 wt % relative to the copolymer as a whole and a secondary elastomer afford better performance than the tires made with an innerliner having a Bromobutyl rubber/secondary elastomer blend of the same ratio. The IPR values obtained for the tire with an 80/20 EXXPRO™/NR innerliner, composition 29, is equivalent to the value for the tire having an innerliner made with a 100% BIIR, composition 25. Blending the EXXPRO™ elastomer with a secondary rubber component, i.e. natural rubber, affords a compound with better processing properties than the 100% Bromobutyl rubber innerliner compound, compare Mooney viscosity and Mooney scorch values for compositions 25 and 29 and 30 (Table 11).

We claim:

1. A composition comprising:
   at least one halogenated random copolymer of isobutylene and methylstyrene; wherein the at least one halogenated random copolymer comprises at least 9.0 wt % para-methylstyrene, based upon the weight of the at least one halogenated random copolymer; and at least one general purpose rubber; wherein the composition comprises from 70 phr to 97 phr of the at least one halogenated random copolymer, from 30 phr to 3 phr of the at least one general purpose rubber, and 20 phr to 100 phr of carbon black.

2. The composition of claim 1, wherein the at least one halogenated random copolymer comprises at least 9.5 wt % para-methylstyrene, based upon the weight of the at least one halogenated random copolymer.

3. The composition of claim 1, wherein the at least one halogenated random copolymer is halogenated with chlorine or bromine.

4. The composition of claim 3, wherein the at least one halogenated random copolymer comprises from 0.1 to 5 wt % halogen based upon the total weight of the at least one halogenated random copolymer.

5. The composition of claim 1, wherein the at least one general purpose rubber comprises natural rubbers (NR), polyisoprene rubber (IR), poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), or mixtures thereof.

6. The composition of claim 1, wherein the composition further comprises at least one thermoplastic resin or further comprises a secondary composition comprising at least one thermoplastic resin.

7. The composition of claim 1, wherein the composition comprises:
   a) at least one additional filler selected from calcium carbonate, clay, mica, silica, silicates, talc, titanium dioxide, starch, wood flour, or mixtures thereof
   b) at least one clay selected from montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof
   c) at least one processing oil selected from aromatic oil, naphthenic oil, paraffinic oil, or mixtures thereof
   d) at least one polybutene processing aid;
   e) at least one cure package or wherein the composition has undergone at least one process to produce a cured composition; or
   f) any combination of a-e.

8. The composition of claim 7, wherein the at least one clay is treated with a modifying agent.

9. A process to produce the composition of claim 1.

10. An article comprising the composition of claim 1.

11. The article of claim 10, wherein the composition comprises an effective amount of the at least one halogenated random copolymer to impart to the article a MOCON (as herein defined) of 37.5 cc-mil/m$^2$-day-mmHg or lower.

12. The article of claim 11, wherein the article is selected from the group consisting of innerliners, bladders, air membranes, innertubes, air barriers, films, layers (microlayers and/or multilayers), treads, and sidewalls.

13. A process to produce the article of claim 11 or 12.

14. A tire comprising the article of claim 11.

15. The tire of claim 14, wherein the composition comprises an effective amount of the at least one halogenated random copolymer to impart to the tire an Inflation Pressure Retention (IPR) (as herein defined) of 2.0 or lower.

16. The tire of claim 14, wherein the composition comprises an effective amount of the at least one halogenated random copolymer to impart to the tire an Intracarcass Pressure (ICP) (as herein defined) of 80 or lower.

17. The tire of any of claim 14, wherein the composition comprises an effective amount of the at least one halogenated random copolymer to impart to the tire a Tire Durability (as herein defined) of 470 or higher.

18. A process to produce the tire of claim 14.

19. A vehicle comprising the tire of claim 14.

20. A retailer of the tire of claim 14 or the vehicle of claim 18.

21. The use of an article made from a composition comprising at least one halogenated random copolymer of isobutylene and methylstyrene; wherein the at least one halogenated random copolymer comprises at least 9.0 wt % para-methylstyrene, based upon the weight of the at least one halogenated random copolymer and at least one general purpose rubber, wherein the composition comprises from 70 phr to 97 phr of the at least one halogenated random copolymer, from 30 phr to 3 phr of the at least one general purpose rubber, and 20 phr to 100 phr of carbon black in a tire having at least one of (a) an effective amount of the at least one halogenated random copolymer to impart to the tire an Inflation Pressure Retention (IPR) (as herein defined) of 2.0 or lower; (b) an effective amount of the at least one halogenated random copolymer to impart to the tire an Intracarcass Pressure (ICP) (as herein defined) of 80 or lower; and (c) an effective amount of the at least one halogenated random copolymer to impart to the tire a Tire Durability (as herein defined) of 470 or higher.

22. The use of claim 21, wherein the composition comprises an effective amount of the at least one halogenated random copolymer to impart to the tire an Inflation Pressure Retention (IPR) (as herein defined) of 1.8 or lower.

23. The use of claim 21, wherein the composition comprises an effective amount of the at least one halogenated random copolymer to impart to the tire an Intracarcass Pressure (ICP) (as herein defined) of 75 or lower.

24. The use of claim 21, wherein the composition comprises an effective amount of the at least one halogenated random copolymer to impart to the tire a Tire Durability (as herein defined) of 500 or higher.

25. The use of claim 21, wherein the composition comprises from 75 phr to 97 phr of the at least halogenated one random copolymer and from 25 phr to 3 phr of the at least one general purpose rubber.

26. The use of claim 21, wherein the at least one halogenated random copolymer comprises at least 9.5 wt % para-methylstyrene, based upon the weight of the at least one halogenated random copolymer.

27. The use of claim 21, wherein the composition comprises:
a) at least one additional filler selected from calcium carbonate, clay, mica, silica, silicates, talc, titanium dioxide, starch, wood flower, or mixtures thereof
b) at least one clay selected from montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents;
c) at least one processing oil selected from aromatic oil, naphthenic oil, paraffinic oil, or mixtures thereof;
d) at least one polybutene processing aid;
e) at least one cure package or wherein the composition has undergone at least one process to produce a cured composition; or
f) any combination of a-e.

28. The use of claim 27, wherein the at least one clay is treated with a modifying agent.

29. The use of claim 27, wherein the tire has at least two of (a), (b), and (c).

30. The use of claim 27, wherein the tire has (a), (b), and (c).

* * * * *